Jan. 17, 1933.  F. E. STAHL  1,894,914
ANTISKID TIRE CHAIN
Filed June 25, 1931

Inventor
FRANK E. STAHL

Patented Jan. 17, 1933

1,894,914

UNITED STATES PATENT OFFICE

FRANK E. STAHL, OF TONAWANDA, NEW YORK, ASSIGNOR TO THE COLUMBUS McKINNON CHAIN CORPORATION, OF TONAWANDA, NEW YORK, A CORPORATION OF NEW YORK

ANTISKID TIRE CHAIN

Application filed June 25, 1931. Serial No. 546,758.

This invention relates to anti-skid chains. In such chains as now furnished to the public the connection of the cross chain with the side chain is such that the end link of the cross chain often gets pinched or caught in the corner at one or the other of the junctions of the links of the side chain. The object of the present invention is to render this impossible.

The invention is embodied in the example herein shown and described, the feature of novelty being finally claimed.

In the accompanying drawing—

Figures 1, 2, 3:
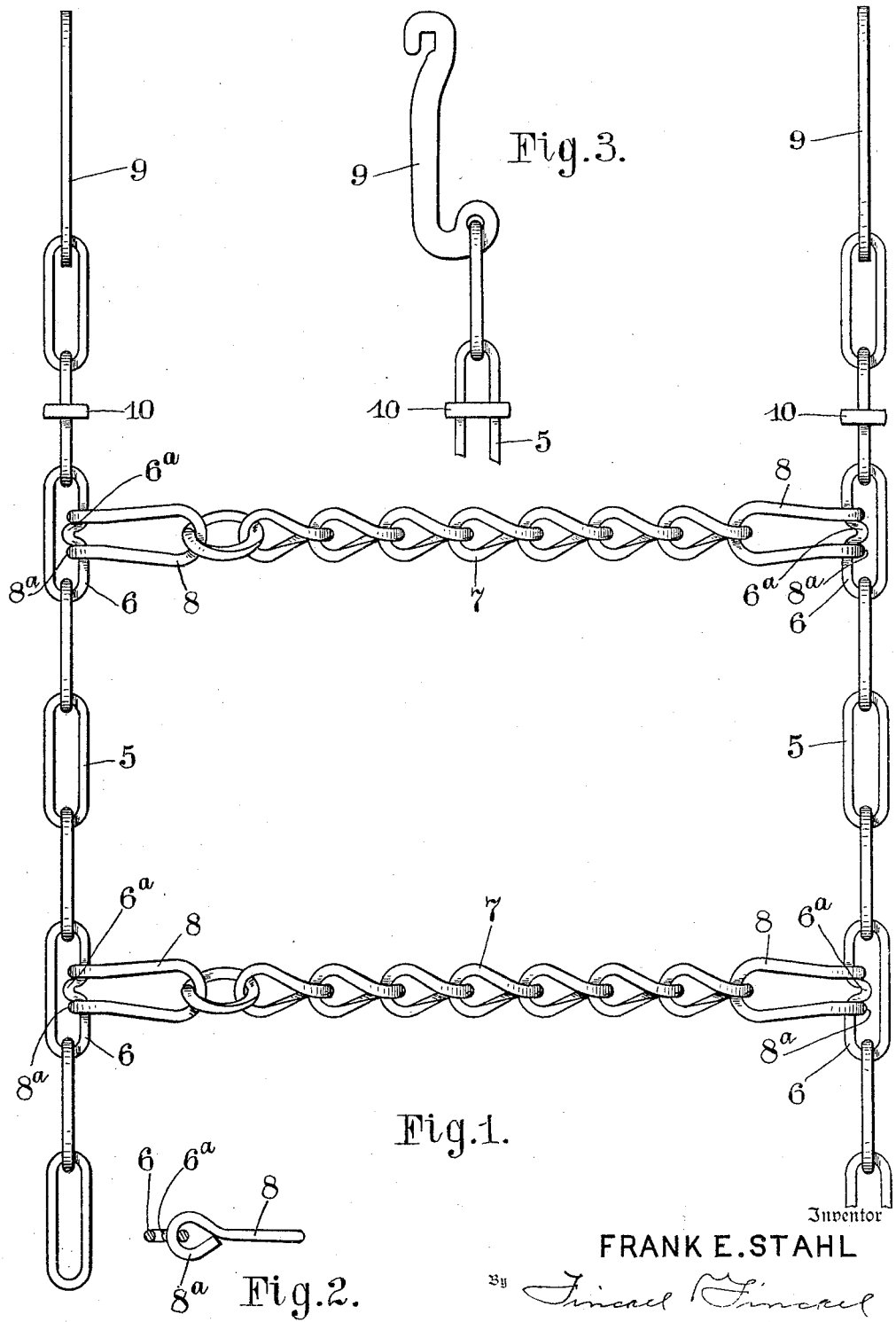
Figure 1 is a plan view of a fraction of an end portion of the anti-skid chain according to my invention.
Fig. 2 is a section illustrating in side view the form of the end links or hooks of the cross chain.
Fig. 3 illustrates the side chain connecting hook, there being one such for each side chain.

In the views the character 5 designates the side chains, each of which contains at regular intervals therein a link 6 provided with a bend 6ª in one of its longer side bars, said bend extending inward toward the opposite side of the link.

The character 7 designates the cross chain, each end of which is provided with a link 8 having two legs spaced apart and bent in hook form or as at 8ª around the wire of the appropriate side chain link on opposite sides of the bend 6ª as shown in Figs. 1 and 2.

With this construction it will be observed that the link 8 cannot slide on the link 6 such sliding being opposed by the bend or hump 6ª hence said link 8 cannot get into a corner between two links of the side chain. The hooks 8ª of the cross chain are bent rather closely so that they cannot be pushed beyond the peak of the bend and the two hooks slide over the bend, but any such sliding is prevented by making the bend deep enough to narrow the space between the peak of the bend and the opposed wire of the link to a distance less than the diameter of the wire of the end link of the cross chain.

The character 9 designates a lever hook or fastener for connecting the opposite ends of the side chain when the anti-skid device is applied to the tire. Said lever hook is first engaged with a plain end link at the opposite end of the side chain and then the hook end of said lever 9 engaged with a keeper link 10 on the link next the end link carrying said hook 9. But this is not a subject of the present invention.

The forms of the parts can be changed without departing from the gist of the invention as claimed.

What I claim is:

1. In an anti-skid chain, a side chain having a link provided with a single bend in the bar of its side to form an internally projecting hump, and a cross chain having a double hook end connected with said link the members of said hook flanking said bend.

2. In an anti-skid chain, a side chain having a link provided with a single bend forming a hump and a cross chain having a double-hook end connected with said link, the members of said double-hook end closely flanking said hump whereby said hook end is prevented from movement longitudinally on the bar of the link containing said hump.

FRANK E. STAHL.